United States Patent
Tokumoto et al.

(10) Patent No.: US 7,415,899 B2
(45) Date of Patent: Aug. 26, 2008

(54) TORQUE DETECTING APPARATUS

(75) Inventors: Yoshitomo Tokumoto, Nabari (JP);
Toshiharu Ishihara, Kashiwara (JP);
Naoki Nakane, Toyota (JP)

(73) Assignees: JTEKT Corporation, Osaka (JP);
Denso Corporation, Aichi (JP)

( * ) Notice: Subject to any disclaimer, the term of this patent is extended or adjusted under 35 U.S.C. 154(b) by 110 days.

(21) Appl. No.: 11/569,204

(22) PCT Filed: May 13, 2005

(86) PCT No.: PCT/JP2005/008787

§ 371 (c)(1),
(2), (4) Date: Nov. 16, 2006

(87) PCT Pub. No.: WO2005/111564

PCT Pub. Date: Nov. 24, 2005

(65) Prior Publication Data

US 2007/0186693 A1    Aug. 16, 2007

(30) Foreign Application Priority Data

May 17, 2004    (JP) .............................. 2004-146756

(51) Int. Cl.
*G01L 3/02* (2006.01)
(52) U.S. Cl. .............................. 73/862.331; 73/862.333
(58) Field of Classification Search ............ 73/862.331, 73/862.333
See application file for complete search history.

(56) References Cited

U.S. PATENT DOCUMENTS

| | | | |
|---|---|---|---|
| 5,531,110 A * | 7/1996 | Ohashi et al. ................. 73/146 |
| 6,707,182 B2 * | 3/2004 | Yamanaka et al. ........ 310/67 R |
| 6,847,902 B2 * | 1/2005 | Fukaya et al. ................. 702/43 |
| 6,880,411 B2 * | 4/2005 | Nakane et al. ......... 73/862.331 |
| 6,928,887 B2 * | 8/2005 | Nakane et al. ......... 73/862.331 |
| 7,051,602 B2 * | 5/2006 | Nakane et al. ......... 73/862.333 |
| 7,287,440 B1 * | 10/2007 | Maehara ................. 73/862.322 |
| 2002/0189371 A1 | 12/2002 | Nakane et al. |
| 2003/0209087 A1 | 11/2003 | Nakane et al. |

FOREIGN PATENT DOCUMENTS

| | | |
|---|---|---|
| DE | 102 22 118 A1 | 11/2002 |
| FR | 2 824 910 A1 | 11/2002 |
| JP | 2003-149062 A | 5/2003 |

\* cited by examiner

*Primary Examiner*—Max Noori
(74) *Attorney, Agent, or Firm*—Darby & Darby P.C.

(57) ABSTRACT

The number n of N-poles and S-poles circumferentially aligned on the cylindrical magnet that integrally rotates with the first shaft is determined so as to be a greatest integer that satisfies the following formula that includes a maximum value $T_{max}$ (Nm) of the torque to be detected and a torsion spring constant k (Nm/deg) of the torsion bar connecting the first shaft and the second shaft: $2 \cdot n \cdot T_{max}/k < 360$. The cylindrical magnet includes teeth-shaped portions in which portions corresponding to the N-poles and the S-poles are of a protruding shape, so that adhesion of magnetic dust concentrates at the protruding portions. Thus, a torque detecting apparatus is provided that reduces the effect of the adhesion of the magnetic dust, so as to attain higher detection sensitivity and thereby improve the detection accuracy, without incurring an increase in cost.

3 Claims, 4 Drawing Sheets

TORQUE DETECTING APPARATUS

CROSS-REFERENCE TO PRIOR APPLICATIONS

This is a U.S. national phase application under 35 U.S.C. §371 of International patent application Ser. No. PCT/JP2005/008787, filed May 13, 2005, and claims the benefit of Japanese Application No. 2004-146756, filed May 17, 2004, both of which are incorporated by reference herein. The International Application was published in Japanese on Nov. 24, 2005 as International Publication No. WO 2005/111564 A1 under PCT Article 21(2).

TECHNICAL FIELD

The present invention relates to a torque detecting apparatus to be used for detecting a steering torque applied to a steering member, for example in an electric power steering apparatus.

BACKGROUND ART

In an electric power steering apparatus that drives a motor for steering assistance in accordance with a rotational operation of a steering member such as a steering wheel and transmits the rotational force of the motor to a steering mechanism thus to assist the steering, a steering torque applied to the steering member has to be detected for the drive control of the motor for steering assistance, and for such detection a torque detecting apparatus has been conventionally employed halfway of a steering shaft connecting the steering member and the steering mechanism.

In the torque detecting apparatus, the steering shaft, which is the object of the detection, is split into a first shaft and a second shaft coaxially connected through a torsion bar of a reduced diameter, so that when a steering torque is applied to the steering shaft by a rotational operation of the steering member, a relative angular displacement is created between the first and the second shaft along with distortion of the torsion bar caused by the effect of the steering torque, and the steering torque is detected based on the relative angular displacement.

The detection of the relative angular displacement between the first and the second shaft has been executed by various means, one of which is found in a torque detecting apparatus that includes a cylindrical magnet that integrally rotates with the first shaft and a magnetic yoke that integrally rotates with the second shaft, so as to detect the relative angular displacement utilizing a variation of a magnetic circuit between the cylindrical magnet and the magnetic yoke (For example, refer to Patent Document 1).

The magnetic yoke that integrally rotates with the second shaft includes a plurality of magnetic pole nails circumferentially aligned on a ring-shaped yoke element so as to axially extend in a same direction, such that two of such yoke elements opposing each other with the respective magnetic pole nails alternately aligned in a circumferential direction constitute a pair, and such pair is fixed on the second shaft. The cylindrical magnet that integrally rotates with the first shaft is constituted as a multi-pole magnet including the same number of magnetic poles circumferentially aligned thereon as that of the magnetic pole nails of the magnetic yoke, and is fixed on the first shaft at such a position that each of the magnetic pole nails of the paired magnetic yoke falls on a boundary between a N-pole and a S-pole.

On an outer side of the paired magnetic yoke, magnetic focusing rings that collect the magnetic flux generated on the magnetic yokes are fixedly disposed, so as to closely surround the outer side of the respective yoke element. The magnetic focusing rings respectively include a magnetic focusing projection, formed so as to project from a position circumferentially corresponding to each other and thus to oppose each other with a narrow airgap therebetween, and between the magnetic focusing projections, a magnetic sensor constituted of a hall element or the like is disposed.

Under such structure, when the relative angular displacement is created between the the first shaft and the second shaft, the circumferential positional relationship between the magnetic pole nails of the paired magnetic yoke and the magnetic poles of the cylindrical magnet changes in an opposite direction to each other, and a change of the magnetic flux in the respective magnetic yoke in accordance with the positional change increases or decreases the density of the magnetic flux leaking out into the airgap between the magnetic focusing projections, thereby changing an output of the magnetic sensor. Accordingly, picking up such change in output leads to detection of the torque applied to the first and the second shaft (steering torque).

Patent Document 1: Japanese Patent Application Laid-Open No. 2003-149062

DISCLOSURE OF THE INVENTION

Problems to be Solved by the Invention

In the torque detecting apparatus thus configured, the torque detection sensitivity depends on a magnitude of the change in output of the magnetic sensor, and hence various measures have been conventionally taken in order to upgrade the detection sensitivity, such as reducing as much as possible the airgap between the magnetic yoke and the cylindrical magnet and between the magnetic yoke and the magnetic focusing ring, as well as the airgap between magnetic focusing projections, and optimally selecting the materials of the cylindrical magnet, the magnetic yoke and the magnetic focusing ring so as to increase the magnetic flux density itself to be detected by the magnetic sensor, and further employing a magnetic sensor that provides a high output.

Reducing the airgap, however, requires improving the morphological accuracy of the cylindrical magnet, the magnetic yoke and the magnetic focusing ring as well as the assembly accuracy including the positioning thereof, which incurs disadvantages such as an increase in number of manufacturing steps and in cost of the product. Besides, the optimal selection of the materials of the cylindrical magnet, magnetic yoke and the magnetic focusing ring, and employing a high-output magnetic sensor as well, also lead to an increase in cost of the product.

Another factor that degrades the torque detection sensitivity of the torque detecting apparatus configured as above is presence of magnetic dust (such as iron powder) that adheres to the cylindrical magnet. When such dust adheres between the magnetic poles of the cylindrical magnet, or is present between the cylindrical magnet and the magnetic yoke, magnetic short-circuit takes place in each location where the dust is present, thereby unfavorably affecting the output of the magnetic sensor thus to degrade the torque detection sensitivity and the torque detection accuracy.

The present invention has been achieved in view of the foregoing situation, with an object to provide a torque detecting apparatus including an optimally selected number of magnetic poles of the cylindrical magnet of an optimally selected design so as to upgrade the torque detection sensitivity without incurring an increase in cost of the product, in which the effect of the adhesion of the magnetic dust is reduced, so as to attain higher detection sensitivity and thereby improve the detection accuracy.

Means for Solving the Problems

A first aspect of the present invention provides a torque detecting apparatus comprising a first shaft and a second shaft coaxially connected through a torsion bar; a cylindrical magnet that integrally rotates with the first shaft, including a plurality of circumferentially aligned magnetic poles; a set of magnetic yokes that integrally rotate with the second shaft, disposed in a magnetic field generated by the cylindrical magnet; a set of magnetic focusing rings fixedly disposed so as to surround an outer side of each magnetic yoke; and a magnetic sensor disposed between magnetic focusing projections provided so as to project from a portion of the respective magnetic focusing rings and to oppose each other defining a predetermined airgap, to thereby detect a torque applied to the first shaft and the second shaft based on magnetic flux density between the magnetic focusing projections detected by the magnetic sensor; wherein the number of magnetic poles n of the cylindrical magnet is a greatest integer that satisfies the following formula that includes a maximum value $T_{max}$ (Nm) of the torque to be detected and a torsion spring constant k (Nm/deg) of the torsion bar:

$$2 \cdot n \cdot T_{max}/k < 360.$$

According to the present invention, the number of magnetic poles of the cylindrical magnet is determined so as to satisfy the foregoing formula, so that when a maximum torque to be detected is applied, an optimal change in output within a desirable range for the magnetic sensor is created by the relative angular displacement between the cylindrical magnet that integrally rotates with the first shaft and the magnetic yoke that integrally rotates with the second shaft, thereby achieving higher detection sensitivity.

A second aspect of the present invention provides a torque detecting apparatus in which the cylindrical magnet according to the first aspect includes projections formed in both directions axially of the magnetic yoke, and a teeth-shaped portion formed on an end face of the projections such that a section corresponding to each magnetic pole is of a protruding shape.

According to the second aspect, the teeth-shaped portion, in which the sections corresponding to the respective magnetic poles are formed in a protruding shape, is provided on each end face of the cylindrical magnet projecting from the both sides of the magnetic yoke, so as to concentrate the adhesion of the magnetic dust emerging under the environment of use at the protruding sections of the teeth-shaped portion spaced from the position opposing the magnetic yoke, thus to allethrough te the degradation in torque detection sensitivity and hence in torque detection accuracy incurred by the adhesion.

Further, a third aspect of the present invention provides a torque detecting apparatus in which the teeth-shaped portion according to the second aspect includes protruding portions and recessed portions, respectively formed in a triangular shape and circumferentially aligned.

According to the third aspect, the magnetic flux is concentrated at the topmost portion of the protruding portions of a triangular shape corresponding to the respective magnetic poles, so that the adhesion of the magnetic dust present under the environment of use is concentrated at the topmost portion most distant from the position opposing the magnetic yoke and also spaced from an adjacent magnetic pole, thereby allethrough ting the degradation in torque detection sensitivity and in torque detection accuracy incurred by the adhesion of the dust.

Effects of the Invention

In the torque detecting apparatus according to the first aspect of the present invention, such a simple method as optimizing the number of magnetic poles circumferentially aligned on the cylindrical magnet allows maximizing the output of the magnetic sensor employed as a detecting means, and upgrading the torque detection sensitivity thus improving the detection accuracy, without incurring an increase in cost of the product.

In the torque detecting apparatus according to the second aspect of the present invention, since the teeth-shaped portion including the protruding portions corresponding to the magnetic poles is provided on the respective end faces of the cylindrical magnet so as to project from the both sides of the magnetic yoke, the adhesion of the magnetic dust is concentrated at the protruding portions of the teeth-shaped portion, which suppresses the occurrence of a short-circuit between the magnetic poles of the cylindrical magnet, as well as between the cylindrical magnet and the magnetic yoke, caused by the dust adhesion, thereby preventing degradation in detection sensitivity and enabling detecting the torque with higher accuracy.

Further, in the torque detecting apparatus according to the third aspect of the present invention, since the teeth-shaped portion includes the protruding portions and the recessed portions of a triangular shape and circumferentially aligned on the end faces of the cylindrical magnet, the adhesion of the magnetic dust is more intensely concentrated at the topmost portion of the triangular protruding portions, which leads to enhanced advantages such as further assuring the prevention of the degradation in detection sensitivity due to the dust adhesion, and enabling the torque detection with higher accuracy.

Figure 1:
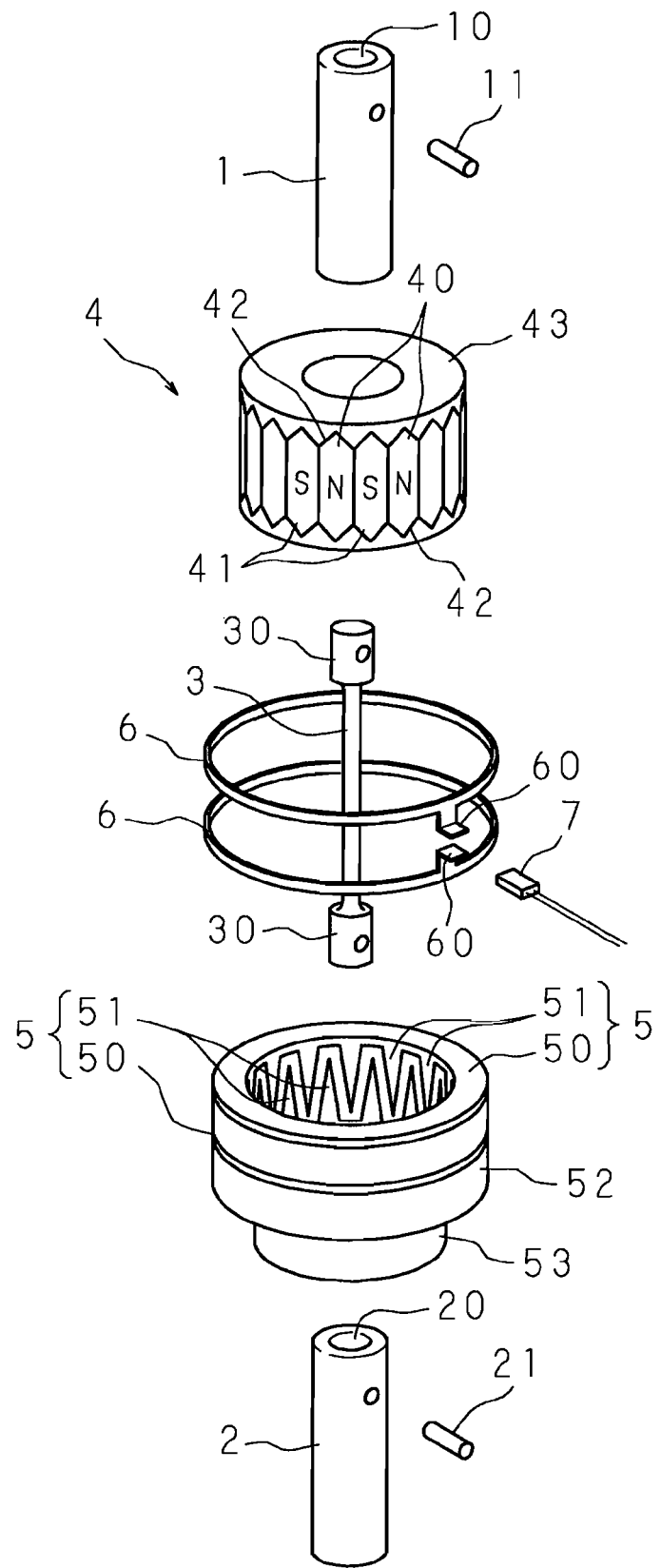
FIG. 1 is an exploded perspective view showing a torque detecting apparatus according to the present invention.

DESCRIPTION OF REFERENCE NUMERALS 1 first shaft
2 second shaft
3 torsion bar
4 cylindrical magnet
5 magnetic yoke
6 magnetic focusing ring
7 magnetic sensor
40 N-pole (magnetic pole)
41 S-pole (magnetic pole)
42 teeth-shaped portion
60 magnetic focusing projection

BEST MODE FOR IMPLEMENTING THE INVENTION

Figure 2:
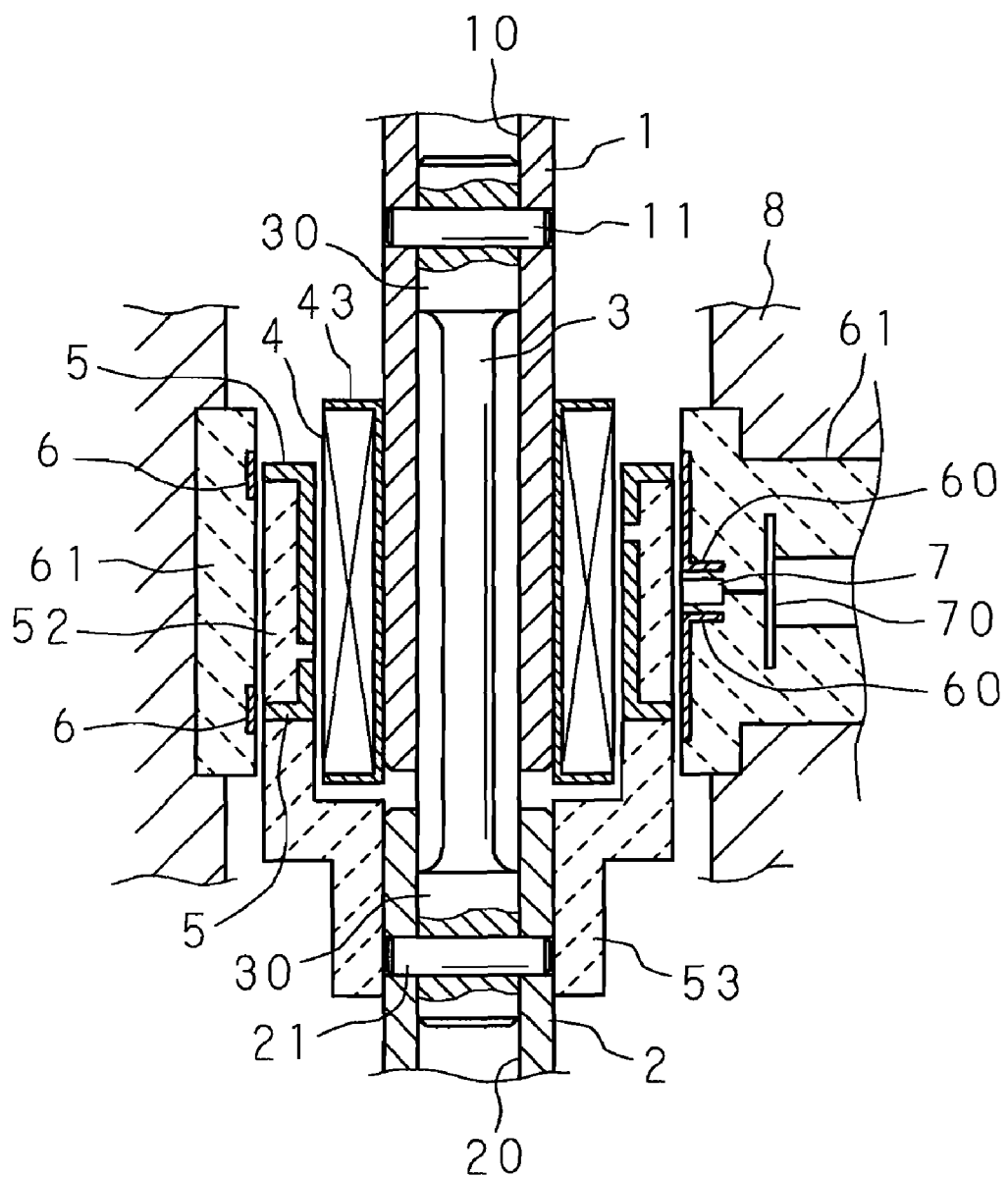
FIG. 2 is a vertical cross-sectional view showing an assembled state of the torque detecting apparatus according to the present invention.

Hereunder, the present invention will be described in details based on the drawings showing an embodiment thereof. FIG. 1 is an exploded perspective view showing a torque detecting apparatus according to the present invention, and FIG. 2 is a vertical cross-sectional view showing an assembled state thereof.

The torque detecting apparatus according to the present invention serves to detect a torque applied to a first shaft 1 and a second shaft 2 coaxially connected through a torsion bar 3, and includes a cylindrical magnet 4 that integrally rotates with the first shaft 1, a pair of magnetic yokes 5, 5 that integrally rotate with the second shaft 2, magnetic focusing ring 6, 6 fixedly disposed so as to respectively surround the outer side of the magnetic yokes 5, 5 to collect the magnetic flux generated in the respective magnetic yokes 5, 5, and a magnetic sensor 7 disposed in a subsequently described manner between the magnetic focusing rings 6, 6.

The torsion bar 3 includes a round bar of a minor diameter, and short joint portions 30, 30 of a major diameter coupled to the respective ends of the round bar, for connection to the first shaft 1 and the second shaft 2. The first shaft 1 and the second shaft 2 respectively include along its axial line a joint hole 10, 20 in which the joint portion 30, 30 can be insert-fitted, so that the first shaft 1 and the second shaft 2 can be coupled to the torsion bar 3 by insert-fitting the joint portions 30, 30 on the respective ends of the torsion bar 3 into the joint hole 10, 20 of the first shaft 1 and the second shaft 2 respectively, and hammering joint pins 11, 21 into the first shaft 1 and the second shaft 2 respectively, thus constituting an integral structure.

When a rotational torque is applied to the first shaft 1 and the second shaft coupled as above, the torsion bar 3 is torsionally deformed by the action of the rotational torque, and a relative angular displacement is created between the first shaft 1 and the second shaft 2, in accordance with the torsional angle of the torsion bar 3. The magnitude of the relative angular displacement is uniquely determined by a torsion spring constant k (Nm/deg) of the torsion bar 3 acting as a torsion spring, and the torsion spring constant k can be accurately obtained based on the material, length and diameter of the torsion bar 3.

As shown in FIG. 1, the cylindrical magnet 4 that integrally rotates with the first shaft 1 is constituted as a multi-pole magnet including a plurality of magnetic poles (plurality of N-poles 40, 40 . . . and S-poles 41, 41 . . . respectively) circumferentially aligned. The feature of the torque detecting apparatus according to the present invention lies in the configuration of the cylindrical magnet 4, and to be more detailed, the number of the circumferentially aligned N-poles 40, 40 . . . and that of the S-poles 41, 41 . . . are determined as subsequently described and, as shown in FIG. 1, a teeth-shaped portion 42, 42 configured such that central portions of the respective N-poles 40, 40 . . . and S-poles 41, 41 . . . are of a protruding shape and boundaries between the N-pole 40 and S-pole 41 are of a recessed shape is provided on the respective axial end faces of the cylindrical magnet 4 along the entire circumference thereof. The cylindrical magnet 4 thus configured has the end face including the teeth-shaped portion 42, 42 and the inner surface covered with a molded resin 43 of an appropriate thickness, and is fixedly fitted to the first shaft 1 coaxially, through the molded resin 43.

Here, although the teeth-shaped portion 42, 42 shown in FIG. 1 includes triangular protruding sections and recessed sections circumferentially aligned, the teeth-shaped portion 42, 42 may be configured in a desired shape, as already stated, as long as the central portions of the respective magnetic poles are of a protruding shape and the boundaries between the magnetic poles are of a recessed shape.

Figure 3A:
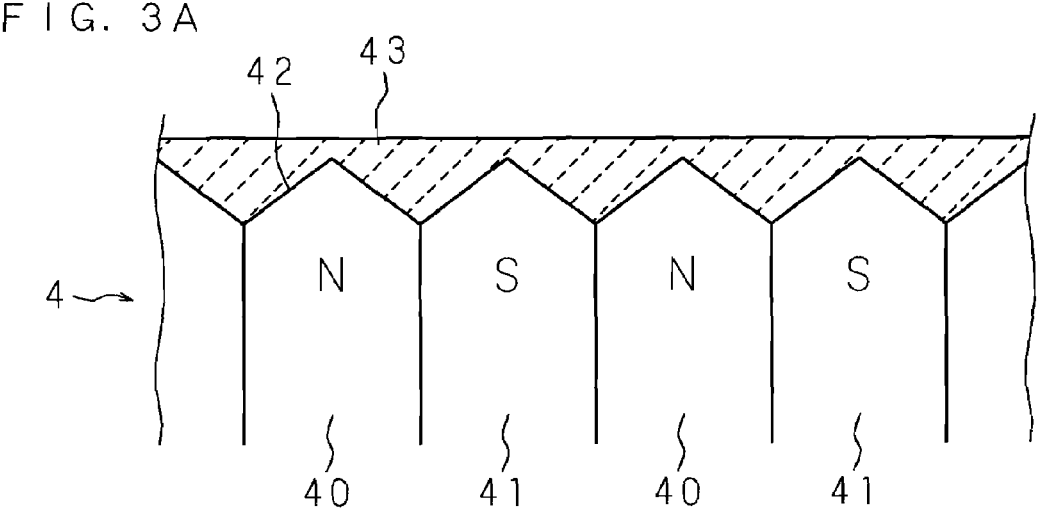
FIGS. 3(a) to 3(c) are explanatory drawings showing morphological examples of a teeth-shaped portion on each end face of a cylindrical magnet.
Figure 3B:
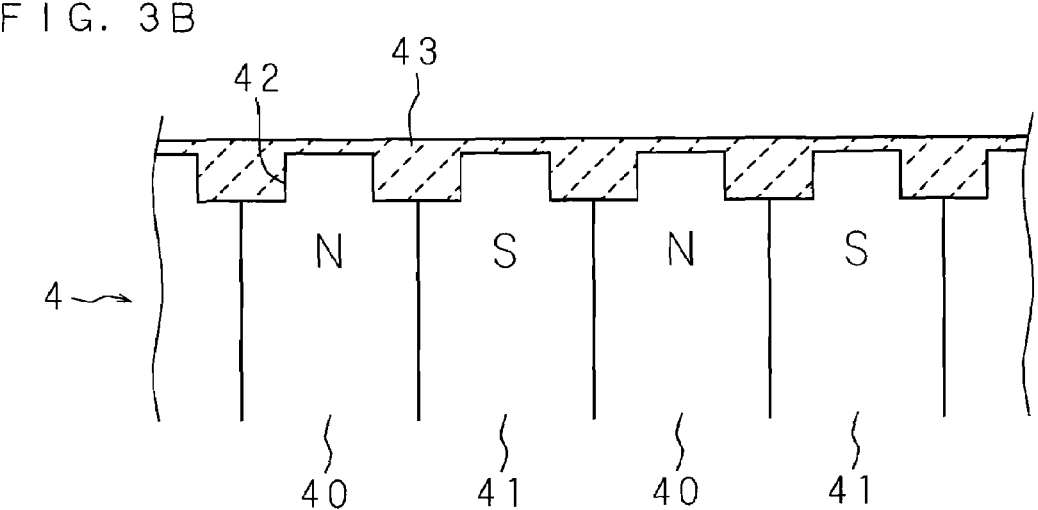
Figure 3C:
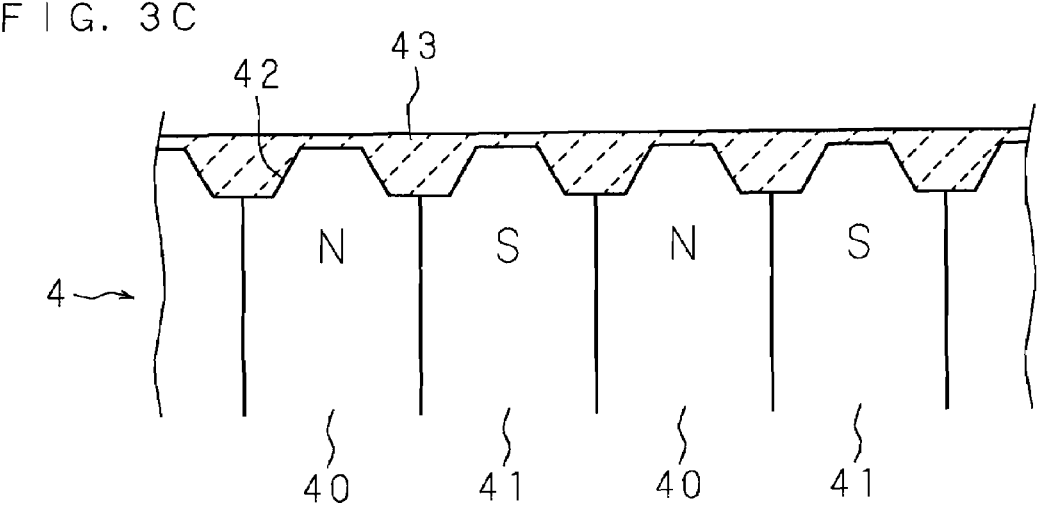

FIGS. 3(a) to 3(c) are explanatory drawings showing morphological examples of the teeth-shaped portion, in which the teeth-shaped portion 42 on an end face of the cylindrical magnet 4 is linearly extended. FIG. 3(a) shows the teeth-shaped portion 42 according to FIG. 1, while FIG. 3(b) shows the teeth-shaped portion 42 including short-rectangular protruding sections and recessed sections circumferentially aligned, and FIG. 3(c) shows the teeth-shaped portion 42 including trapezoidal protruding sections and recessed sections circumferentially aligned.

The pair of magnetic yokes 5, 5 that integrally rotate with the second shaft 2 are, as shown in FIG. 1, components of a magnetic material respectively constituted of a ring-shaped yoke element 50 including a plurality of axially extending magnetic pole nails 51, 51 . . . circumferentially aligned at regular intervals. The magnetic yokes 5, 5 are mutually positioned such that the tip portions of the magnetic pole nails 51, 51 . . . oppose each other and are alternately aligned circumferentially, and unified by a cylindrically formed molded resin 52 that covers the outer face of the magnetic yokes 5, 5, and then fixedly fitted coaxially to an end portion of the second shaft 2 through a boss portion 53 extended in one direction from the molded resin 52.

The magnetic yokes 5, 5 thus configured are, as shown in FIG. 2, assembled at such a position that the inner surface of the respective yokes including the magnetic pole nails 51, 51 . . . confront the outer circumferential surface of the cylindrical magnet 4 fixedly fitted to the first shaft 1 with a fine airgap therebetween, once the first shaft 1 and the second shaft 2 are coupled through the torsion bar 3. Here, the axial length of the cylindrical magnet 4 is made longer than that of the magnetic yokes 5, 5, such that the respective end portions of the cylindrical magnet 4 where the teeth-shaped portions 42, 42 are provided axially protrude in both direction by a predetermined length from the magnetic yokes 5, 5, as shown in FIG. 2.

Figure 4A:
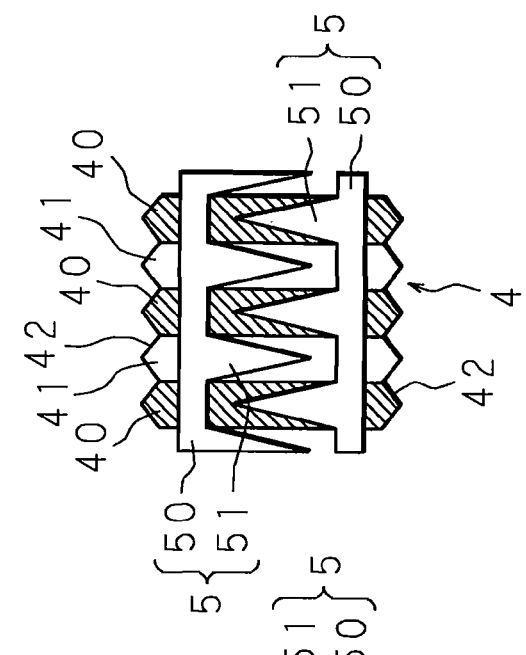
FIGS. 4(a) to 4(c) are explanatory drawings showing a circumferential positional relationship between a magnetic yoke and the cylindrical magnet.
Figure 4B:
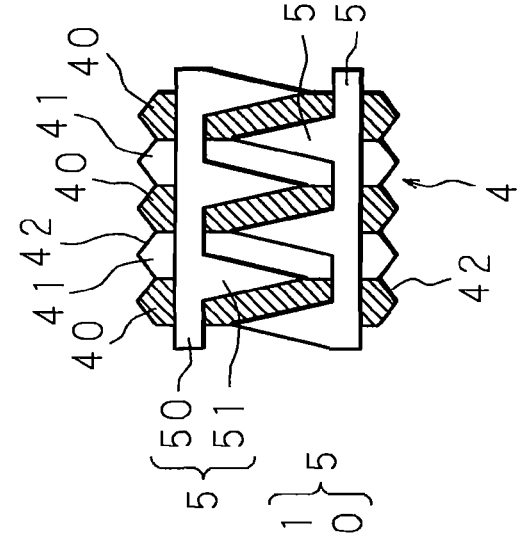
Figure 4C:
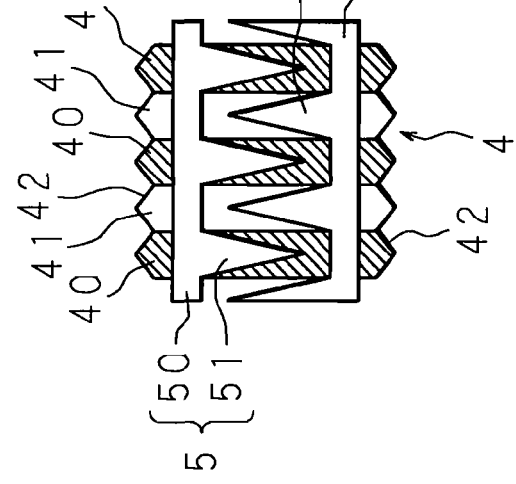

FIGS. 4(a) to 4(c) are explanatory drawings showing a circumferential positional relationship between the magnetic pole nails 51, 51 . . . of the magnetic yoke 5, 5 and the N-poles 40, 40 . . . and S-poles 41, 41 . . . of the cylindrical magnet 4. FIG. 4(b) shows the positional relationship at the time of assembly, in which the magnetic yoke 5, 5 and the cylindrical magnet 4 are, as shown therein, circumferentially positioned such that the respective magnetic pole nails 51, 51 . . . fall on a boundary between the N-pole 40 and the S-pole 41 circumferentially aligned on the cylindrical magnet 4.

Under such positional relationship at the time of assembly, the magnetic pole nails 51, 51 . . . of the two magnetic yokes 5, 5 are positioned under an equal condition in the magnetic field generated between the adjacently disposed N-pole 40 and S-pole 41 along the circumference of the cylindrical magnet 4. Accordingly, the number of magnetic field lines flowing into and out of those magnetic pole nails 51, 51 . . . becomes generally equal, and hence the magnetic flux generated on the yoke element 50, 50 connecting the base portions of the magnetic pole nails 51, 51 . . . becomes equal.

The positional relationship thus defined between the magnetic yokes 5, 5 and the cylindrical magnet 4 is changed as shown in FIG. 4(a) or FIG. 4(c) in accordance with the relative angular displacement created between the first shaft 1 to which the cylindrical magnet 4 is fixed and the second shaft 2 to which the magnetic yokes 5, 5 are fixed, along with distortion of the torsion bar 3, so that the positional relationship between the magnetic pole nails 51, 51 . . . of each of the two magnetic yokes 5, 5 and the boundary between the N-pole 40 and the S-pole 41 of the cylindrical magnet 4 is shifted in mutually opposite directions, which incurs an increase in magnetic field lines of the reverse polarity on the magnetic pole nails 51, 51 . . . of one of the magnetic yokes 5 and on those of the other magnetic yoke 5, so as to generate positive and negative magnetic flux on one of the yoke elements 50 and on the other.

Under such situation, the positive and negative polarity of the magnetic flux generated on the yoke elements 50, 50 are determined depending on the direction of the relative angular displacement between the cylindrical magnet 4 and the magnetic yoke 5, 5, i.e. between the first shaft 1 and the second shaft 2, and the density of the positive and negative magnetic flux corresponds to the magnitude of the relative angular displacement.

Around the outer side of the yoke elements 50, 50 of the magnetic yokes 5, 5, the magnetic focusing rings 6, 6 are disposed so as to surround each of the yoke elements 50, 50 at positions respectively corresponding thereto. As shown in FIG. 1, the magnetic focusing ring 6 is a circular ring of a magnetic material having a slightly larger inner diameter than the outer diameter of the yoke element 50, and includes a magnetic focusing projections 60 formed so as to axially extend from a position along the circumference of the magnetic focusing ring 6 and bent such that the tip portion is oriented radially outward.

The two magnetic focusing rings 6 respectively corresponding to each magnetic yoke 5, 5, which constitute a pair, are coaxially positioned such that the bent tip portion of the respective magnetic focusing projections 60, 60 opposes each other with a predetermined gap therebetween, and unified by a molded resin 61 so as to maintain such configuration. The magnetic focusing rings 6 are also fixedly fitted inside a housing 8 partly shown in FIG. 2 through the molded resin 61, and assembled such that the respective inner circumferential surfaces thereof closely confront the outer circumferential surface of the yoke elements 50, 50 of the corresponding magnetic yokes 5, 5.

Between the magnetic focusing projections 60, 60 of the magnetic focusing rings 6, 6, the magnetic sensor 7 constituted of a magnetosensitive element such as a hall element is interposed. The magnetic sensor 7 is integrally retained in the molded resin 61 with a circuit substrate 70 carrying peripheral circuits such as a power supply circuit and an output processing circuit, and positioned in the airgap secured between the magnetic focusing projections 60, 60.

Toward the magnetic flux magnetic focusing rings 6, 6 thus configured, the magnetic flux generated on the yoke elements 50, 50 rotating close to each of the magnetic focusing rings 6, 6 is guided, to be thereby converged at the tip portion of their respective magnetic focusing projections 60, 60 and to leak out into the airgap secured therebetween. At this moment, the magnetic sensor 7 senses the magnetic flux leaking into the airgap, and emits an output corresponding to the density of the leaking magnetic flux. The output is taken up toward outside through the circuit substrate 7.

The magnetic flux density between the magnetic focusing projections 60, 60 varies depending on the magnetic flux generated on the yoke elements 50, 50 corresponding to each of the magnetic focusing rings 6, 6, and the change of the magnetic flux on the yoke elements 50, 50 is caused in accordance with the relative displacement thereof with respect to the cylindrical magnet 4, i.e. the relative angular displacement between the first shaft 1 and the second shaft 2. Accordingly, the output of the magnetic sensor 7 corresponds to the magnitude and direction of the rotational torque applied to the first shaft 1 and the second shaft to thereby create the relative angular displacement, and thus the rotational torque applied to the first shaft 1 and the second shaft 2 can be detected based on the change of the output of the magnetic sensor 7.

In the torque detecting apparatus thus constructed according to the present invention, the number of the circumferentially aligned N-poles 40, 40 . . . and S-poles 41, 41 . . . of the cylindrical magnet 4 is determined as below, so as to optimally enlarge the change of the output of the magnetic sensor 7 produced in accordance with the relative angular displacement between the first shaft 1 and the second shaft 2, to thereby upgrade the torque detection sensitivity based on the change of the output and enable detecting the torque with higher accuracy.

As already stated, the output of the magnetic sensor 7 is zero when the cylindrical magnet 4 and the magnetic yokes 5, 5 are in the initial positional relationship of the time of assembly as shown in FIG. 4(b), and changes to the positive side or negative side depending on the displacement in either direction. Such change proportionately takes place until the cylindrical magnet 4 and the magnetic yokes 5, 5 enter the positional relationship as shown in FIG. 4(a) or FIG. 4(c), more specifically, until the magnetic pole nails 51, 51 . . . of one of the magnetic yokes 5 reach the center of the N-poles 40, 40 . . . circumferentially aligned on the cylindrical magnet 4, and the magnetic pole nails 51, 51 . . . of the other magnetic yoke 5 reach the center of the S-pole 41, 41 . . . cirucumferentially aligned on the cylindrical magnet 4.

Accordingly, to enlarge the output variation of the magnetic sensor 7, it is preferable to arrange such that when an assumed maximum value $T_{max}$(Nm) of the torque to be detected is applied to the first shaft 1 and the second shaft 2, the cylindrical magnet 4 that integrally rotates with the first shaft 1 and the magnetic yokes 5, 5 that integrally rotate with the second shaft 2 are relatively positioned as illustrated in FIG. 4(a) or FIG. 4(c). Here, the relative angular displacement α (deg) between the first shaft 1 and the second shaft 2 under the action of the rotational torque only depends on the torsion spring constant k (Nm/deg) of the torsion bar 3 connecting the shafts 1, 2, and therefore the relative angular displacement $α_{max}$(deg) under the action of the $T_{nax}$ can be obtained through the following formula.

$$α_{max}=T_{max}/k \quad (1)$$

Meanwhile, the amount of the relative angular displacement between the state of FIG. 4(b) and the state of FIG. 4(a) or FIG. 4(c) is the central angle θ corresponding to half a width of the N-pole 40 or S-pole 41 of the cylindrical magnet 4, and such central angle θ (deg) can be defined as the following formula, when the number of magnetic poles (the sum of the N-poles 40, 40 . . . and the S-poles 41, 41 . . . ) circumferentially aligned on the cylindrical magnet 4 is denoted by n.

$$θ=360/2n \quad (2)$$

Therefore, the foregoing condition is satisfied when $α_{max}$ equals to θ, i.e. when the following formula is established.

$$T_{max}/k=360/2n \quad (3)$$

Since the number of magnetic poles n is an integer, determining the number of magnetic poles n of the cylindrical magnet 4 so as to be a greatest integer that satisfies the following formula enables optimally enlarging the output variation of the magnetic sensor 7, thereby upgrading the torque detection sensitivity and thus detecting the torque with higher accuracy.

$$2 \cdot n \cdot T_{max}/k < 360 \quad (4)$$

On the other hand, in the foregoing torque detection process, magnetic dust (such as iron powder) floating under the environment of use may adhere to the cylindrical magnet 4 integrally rotating with the first shaft 1. In the case where such dust adheres to a boundary between the N-pole 40 and the S-pole 41 so as to cause a magnetic short-circuit therebetween, or intrudes into the airgap between the cylindrical magnet 4 and the magnetic yokes 5, 5, the output of the magnetic sensor 7 is thereby affected, and degradation in torque detection sensitivity and hence in torque detection accuracy is thereby incurred.

In the torque detecting apparatus according to the present invention, as already described, the cylindrical magnet 4 includes the teeth-shaped portions 42, 42 on the respective end portions thereof, and the cylindrical magnet 4 is axially longer than the magnetic yokes 5, 5 so that the end portions of the cylindrical magnet 4 where the teeth-shaped portions 42, 42 are provided axially protrude by a predetermined length in both directions from the magnetic yokes 5, 5.

Accordingly, the adhesion of the magnetic dust concentrates at the respective end portions of the cylindrical magnet 4 distant from a portion thereof opposing the magnetic yokes 5, 5, and hence the dust is effectively kept from intruding into the airgap around the magnetic yoke 5, 5. Besides, in the teeth-shaped portion 42, 42 provided on the end portions of the cylindrical magnet 4, the magnetic flux concentrates at the protruding section in a central portion of the respective N-poles 40 and the S-poles 41, thereby attracting the magnetic dust to the protruding sections thus effectively preventing the adhesion of the dust that may cause a short-circuit between the N-pole 40 and the S-pole 41. Consequently, the foregoing disadvantage arising from the adhesion of the magnetic dust can be effectively avoided.

Further, although the teeth-shaped portion 42, 42 serving as above may be formed in various shapes without limitation to the examples shown in FIGS. 3(*a*) to (3*c*), it is preferable, from the viewpoint of effective concentration of the magnetic flux, to adopt a triangular protruding section and recessed section adjacently aligned as shown in FIG. 3(*a*) and FIG. 1, and at least the protruding section should have a corner portion.

What is claimed is:

1. A torque detecting apparatus, comprising:
   a first shaft and a second shaft coaxially connected through a torsion bar;
   a cylindrical magnet which integrally rotates with the first shaft, including a plurality of circumferentially aligned magnetic poles;
   a set of magnetic yokes which integrally rotate with the second shaft, disposed in a magnetic field generated by the cylindrical magnet;
   a set of magnetic concentrating rings fixedly disposed so as to surround an outer side of each magnetic yoke; and
   a magnetic sensor disposed between magnetism concentrating projections provided so as to project from a portion of the magnetism concentrating rings and to oppose each other defining a predetermined airgap;
   wherein a torque applied to the first shaft and the second shaft is detected based on magnetic flux density between the magnetism concentrating projections detected by the magnetism sensor; and
   the number of magnetic poles n of the cylindrical magnet is a greatest integer that satisfies the following formula that includes a maximum value $T_{max}$ (Nm) of the torque to be detected and a torsion spring constant k (Nm/deg) of the torsion bar:

$$2 \cdot n \cdot T_{max}/k < 360.$$

2. The torque detecting apparatus according to claim 1, wherein the cylindrical magnet includes projections formed in both directions axially of the set of magnetic yokes, each projection being formed in a teeth-shaped such that a portion of the projection corresponding to each magnetic pole protrudes.

3. The torque detecting apparatus according to claim 2, wherein the portion of the projection, which protrudes, is formed in a triangular shape.

\* \* \* \* \*